Nov. 15, 1938.  C. A. CAMPBELL  2,136,574
AIR BRAKE
Filed Dec. 27, 1933

Inventor
Charles A. Campbell
By
Attorneys

Patented Nov. 15, 1938

2,136,574

UNITED STATES PATENT OFFICE 2,136,574

AIR BRAKE

Charles A. Campbell, Watertown, N. Y., assignor to The New York Air Brake Company, a corporation of New Jersey Application December 27, 1933, Serial No. 704,187

14 Claims. (Cl. 303—21)

This invention relates to vehicle brakes and particularly to means for controlling the intensity of brake application to ensure smooth stops in the shortest practicable distance.

Heretofore it has been proposed to control the intensity of brake application in response to an inertia effect produced by the deceleration caused by such brake application. In the prior art devices, a uniform rate of deceleration throughout the stop was sought. It has also been proposed to control the intensity of application in response to train speed or wheel speed. Neither of the schemes above outlined has proved entirely satisfactory in service though each has some valuable characteristics.

According to the present invention the intensity of brake application is controlled by an inertia device having means to adjust it to maintain different decelerative rates. This adjusting means is controlled in response to train speed (or wheel speed).

This permits the decelerative rate to be varied through the whole or any part of the speed range.

In the embodiment illustrated means are shown to limit the speed control of deceleration to a part only of the speed range, and specifically to the low speed range. In such embodiment, if a full application of the brakes be made at high speed, a rapid substantially uniform rate of deceleration will first be maintained by the action of the inertia device in controlling the intensity of application. At a relatively low train speed, say five miles per hour, the speed responsive device commences to readjust the inertia device to establish a lower and lower decelerative rate until a definite minimum setting is reached, such minimum being chosen to ensure a smooth but certain stop.

This system of control is applicable to power brakes generally, irrespective of the power medium. Thus while a pneumatic brake of the simplest straight air type is described below for purpose of explanation, the invention is applicable to pneumatic systems of other than the straight air type, and also to electromagnetic and hydraulic systems of the prior art. The only requirement is that the intensity of application be adjustable.

Figure 1:
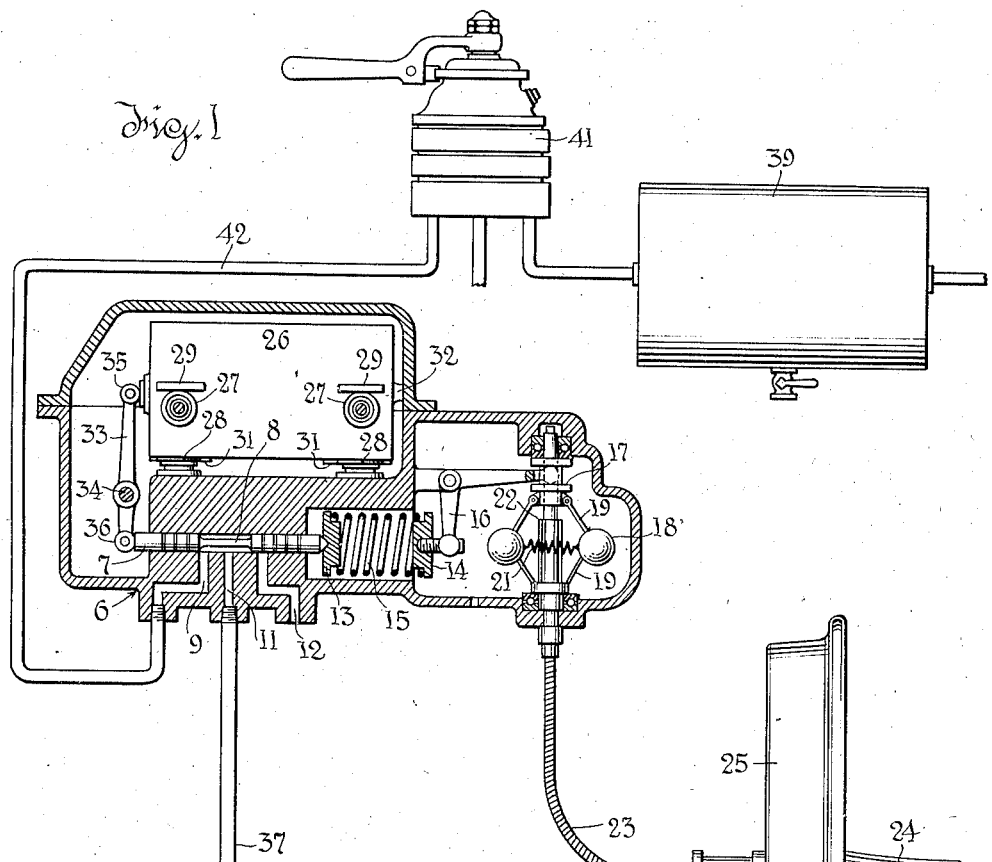
Fig. 1 is a diagrammatic view partly in section and partly in elevation showing the invention embodied for use on a single end car or train. The train is supposed to travel to the left relatively to the drawing.

The control mechanism includes a body 6 in which is formed a cylindrical bore serving as a chamber for a balanced piston valve 7. This valve has a reduced middle portion 8, and projects at both ends from body 6.

Leading into the bore are three ports, a supply port 9, a brake cylinder port 11 and an atmospheric port 12, so spaced with reference to the reduced portion 8 of valve 7, that in mid position of the valve both ports 9 and 12 are blanked, while in the left hand position ports 9 and 11 are connected and 12 is blanked, and in the right hand position ports 11 and 12 are connected and 9 is blanked.

The right hand end of valve 7 engages spring seat 13 between which and adjustable spring seat 14 a coil compression spring 15 is confined. Seat 14 is carried by one arm of a bell crank 16 whose other arm engages the shiftable collar 17 of a centrifugal governor.

This governor includes the usual fly balls 18 carried by links 19 and drawn together by tension springs 21. On increase of speed, outward motion of the balls 18 draws collar 17 downward, increasing the stress on spring 15 and setting the device for a high deceleration rate. The downward motion of collar 17 is preferably limited by a stop 22 so that the action of the centrifugal governor is limited to a low speed range. Any desired speed range can be provided for by suitably designing the governor.

The governor is driven through a flexible shaft 23 from the axle 24 of a car wheel 25, and hence rotates at a sped proportional to the rotary wheel speed. This ordinarily is proportional to train speed.

An inertia weight 26 is guided to move freely in a path parallel with the direction of travel of the train. The guiding means comprise rollers 27, 28, engaging flanges or tracks 29, 31, in the weight. Rearward motion of weight 26 is limited by stop 32. Forward motion of the weight from the neutral position shown in Fig. 1, shifts valve 7 to the right. The actuating connection comprises a lever 33 fulcrumed at 34 and having at one end a roller 35 engaging the weight, and at the other end a roller 36 engaging the valve.

Port 11 is connected by brake pipe 37 with any appropriate number of brake cylinders 38, only one such cylinder being illustrated. Air is supplied by main reservoir 39 to engineer's brake valve 41 which may be manipulated to admit such air to pipe 42 or exhaust the pipe. Pipe 42 leads to port 9.

Suppose that a train is running at high speed and the engineer makes a full application by shifting the engineer's brake valve to application position and leaving it there. Initially collar 17 will be at its lower limit of motion, i. e., against stop 19, so that spring 15 will be adjusted for maximum stress. The force developed by the momentum of weight 26 as the train slows will shift valve 7 to maintain a substantially uniform and relatively high rate of deceleration.

At some speed, say about five miles per hour, collar 17 will start up away from stop 19, thus reducing the stress on spring 15 and causing the weight 26 and valve 7 to establish a diminishing deceleration. The minimum deceleration rate will be reached when collar 17 reaches its upper limit of motion and is such as to ensure a smooth and certain stop without undue increase of stopping distance.

Figure 2:
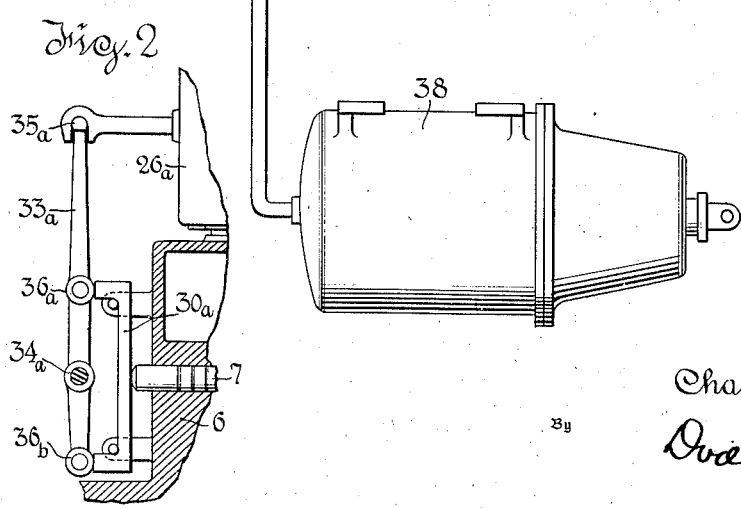
Fig. 2 is a fragmentary view showing how the inertia unit of Fig. 1 may be modified to operate for either of two reverse directions of train motion.

If the inertia control device must operate for both directions of travel of the train, recourse may be had to the arrangement shown in Fig. 2.

Here the weight 26a is shown in its neutral position. It has a pin and slot connection 35a with lever 33a which is fulcrumed at 34a. The lever 33a actuates two rollers 36a, 36b, on opposite sides of fulcrum 34a and these coact with the floating lever 30a which engages the valve 7.

Displacement of weight 26a in either direction from its neutral position, will shift valve 7 to the right. Since the centrifugal governor is indifferent to the direction of rotation of wheel 25, the whole control mechanism is indifferent to the direction of motion of the train.

The invention may be variously embodied and the underlying principle is applicable to the widest variety of power brakes.

What is claimed is,—

1. The combination of regulable braking means for a vehicle, and controlling means therefor comprising an inertia device responsive to vehicle deceleration connected to regulate said braking means, and a device responsive to vehicle speed connected to modify the action of said inertia device.

2. The combination of a wheeled vehicle; regulable braking means for a wheel thereof; and controlling means for said braking means, comprising an inertia device responsive to vehicle deceleration connected to regulate said braking means, and a device responsive to the speed of said braked wheel connected to modify the action of said inertia device.

3. A combined speed and inertia control for brakes, comprising in combination a movable inertia mass; regulating means operable by motion thereof; yielding means for resisting such motion; and speed responsive means for varying the resistance offered by said yielding means.

4. A combined speed and inertia control for brakes, comprising in combination a movable inertia mass; admission and exhaust valve means operable by motion thereof; yielding means for resisting such motion; and speed responsive means for varying the resistance offered by said yielding means.

5. A combined speed and inertia control for brakes, comprising in combination a movable inertia mass; regulating means operable by motion thereof; yielding means for resisting such motion; speed responsive means for varying the resistance offered by said yielding means; and means for limiting the speed range through which said speed responsive means is effective to vary such resistance.

6. A combined speed and inertia control for brakes, comprising in combination a movable inertia mass; admission and exhaust valve means operable by motion thereof; yielding means for resisting such motion; speed responsive means for varying the resistance offered by said yielding means; and means for limiting the speed range through which said speed responsive means is effective to vary such resistance.

7. A combined speed and inertia control for brakes, comprising in combination a movable inertia mass; brake controlling means operable by motion thereof; spring means resisting such motion; and a centrifugal governor connected to vary the stress on said spring means.

8. A combined speed and inertia control for brakes, comprising in combination a movable inertia mass; brake controlling means operable by motion thereof; spring means resisting such motion; a centrifugal governor connected to vary the stress on said spring means; and means for limiting the stress variations thus produced.

9. The combination defined in claim 8, in which the parts are so arranged that the governor starts to change the spring adjustment when a relatively low speed is reached, and completes such change before a state of rest is reached.

10. In a vehicle brake system, in combination, brake means, means for effecting an application of said brake means to produce a braking effect on the vehicle, means operated according to the rate of retardation of the vehicle, means responsive to operation of said last means at a chosen rate of retardation for decreasing the braking effect produced by said brake means, and means governed by the speed of the vehicle for progressively adjusting at what rate of retardation said last means responds.

11. In a vehicle brake system, in combination, brake means, means for effecting an application of said brake means to produce a braking effect on the vehicle, a retardation controller device having an element movable according to the rate of retardation of the vehicle, means responsive to movement of said element for controlling said brake means, yielding means for opposing movement of said element, and means controlled according to the speed of the vehicle for governing the opposition exerted by said yielding means.

12. In a vehicle brake system, in combination, brake means, means for effecting an application of said brake means to produce a braking effect on the vehicle, a retardation controller device having an element operated according to the rate of retardation of the vehicle, means responsive to operation of said element for controlling the degree of application of said brake means, resilient means for opposing movement of said element, means for conditioning said yielding means to exert a substantially constant opposition to operation of said element during service applications of the brakes, and means governed by the speed of the vehicle for conditioning said yielding means to exert opposition to operation of said element according to the speed of the vehicle.

13. In a vehicle brake system, in combination, a brake cylinder, means for effecting a supply of fluid under pressure to the brake cylinder, a retardation controller device having an element movable according to the rate of retardation of the vehicle, means responsive to movement of said element for effecting a release of fluid under pressure from the brake cylinder, means for governing at what rate of retardation said last means responds to movement of said element, and means for controlling said governing means according to the speed of the vehicle.

14. In a vehicle brake system, in combination, a retardation controller device having an element movable according to the rate of retardation of the vehicle, yielding means for opposing movement of said element, regulating means for conditioning said yielding means to oppose movement of said element with variable forces, and means governed by the speed of the vehicle for controlling said regulating means.

CHARLES A. CAMPBELL.